(12) United States Patent
Amin et al.

(10) Patent No.: US 6,483,618 B2
(45) Date of Patent: Nov. 19, 2002

(54) NARROW BAND WAVELENGTH DIVISION DEMULTIPLEXER AND METHOD OF DEMULTIPLEXING OPTICAL SIGNALS (75) Inventors: Jaymin Amin, Corning, NY (US); David L. Weidman, Horseheads, NY (US); Laura A. Weller-Brophy, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/450,607

(22) Filed: Nov. 30, 1999

(65) Prior Publication Data
US 2002/0075537 A1 Jun. 20, 2002

(51) Int. Cl.[7] ............................................... H04J 14/02
(52) U.S. Cl. ....................... 359/127; 359/130; 385/37; 385/24
(58) Field of Search ............................... 359/124, 127, 359/130; 385/43, 24, 27, 37

(56) References Cited

U.S. PATENT DOCUMENTS

| | | |
|---|---|---|
| 5,283,686 A | 2/1994 | Huber |
| 5,461,685 A | 10/1995 | Glance et al. |
| 5,608,825 A | 3/1997 | Ip |
| 5,629,995 A | 5/1997 | Duck et al. |
| 5,652,814 A | 7/1997 | Pan et al. |
| 5,706,375 A | 1/1998 | Mihailov et al. |
| 5,712,717 A | 1/1998 | Hamel et al. |
| 5,726,785 A | 3/1998 | Chawki et al. |
| 5,737,104 A | 4/1998 | Lee et al. |
| 5,748,350 A * | 5/1998 | Pan et al. ..................... 359/127 |
| 5,754,718 A | 5/1998 | Duck et al. |
| 5,822,095 A | 10/1998 | Taga et al. |
| 5,841,918 A * | 11/1998 | Li ................................ 385/24 |
| 5,859,941 A | 1/1999 | Horita et al. |
| 5,909,295 A * | 6/1999 | Li ............................... 359/130 |
| 5,917,626 A * | 6/1999 | Lee ............................. 359/131 |
| 5,943,149 A * | 8/1999 | Cearns et al. ............... 359/124 |
| 6,252,719 B1 * | 6/2001 | Eichenbaum ................ 359/129 |

* cited by examiner

Primary Examiner—Jason Chan
Assistant Examiner—Agustin Bello
(74) Attorney, Agent, or Firm—Svetlana Short

(57) ABSTRACT

A wavelength division demultiplexer includes a channel dropping component for receiving optical signals transmitted through a plurality of optical channels, defined by successively different light wavelength bands at intervals ranging between a first channel having the lowest wavelength band to a last channel having the highest wavelength band. The channel dropping component separates at least one channel having a wavelength band intermediate the lowest wavelength band and the highest wavelength band. The demultiplexer further includes an edge filter for separating optical signals received from the channel dropping component that have wavelengths below the intermediate wavelength band from optical signals having wavelengths above the intermediate wavelength band. The separated optical signals are transmitted from the edge filter in two different optical paths. The demultiplexer further includes a channel separator for separating optical signals transmitted in at least one of the optical paths from one another.

18 Claims, 6 Drawing Sheets

NARROW BAND WAVELENGTH DIVISION DEMULTIPLEXER AND METHOD OF DEMULTIPLEXING OPTICAL SIGNALS

CROSS-REFERENCED TO A RELATED APPLICATION

Reference is made commonly assigned copending patent application serial number, filed simultaneously herewith in the name of Weller-Brophy, Laura and entitled "Narrow Band Wavelength Division Multiplexer and Method of Multiplexing Optical Signals."

BACKGROUND OF THE INVENTION

1. Field of the Invention

The present invention generally relates to optical demultiplexers and more specifically relates to wavelength division demultiplexers.

2. Technical Background

Figure 1:
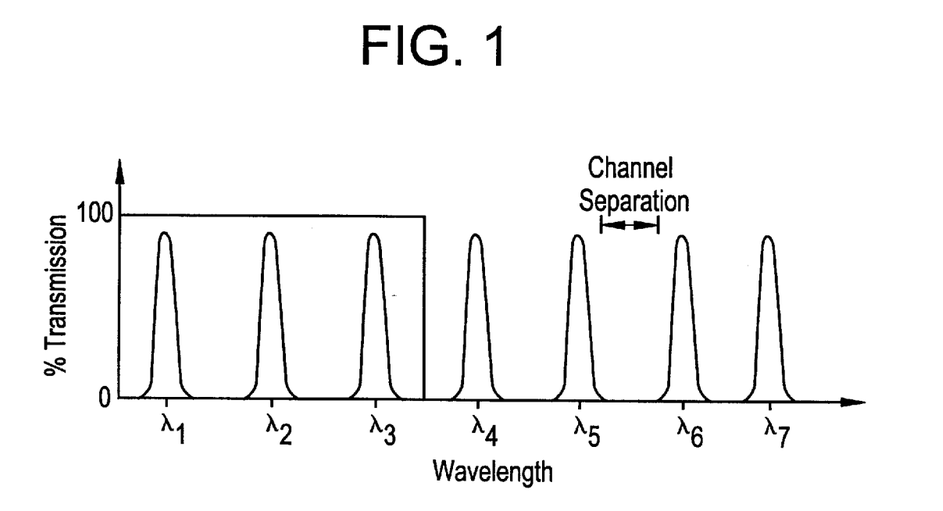
FIG. 1 is a graph illustrating the transmission/reflection characteristics of an ideal edge filter.
Figure 2:
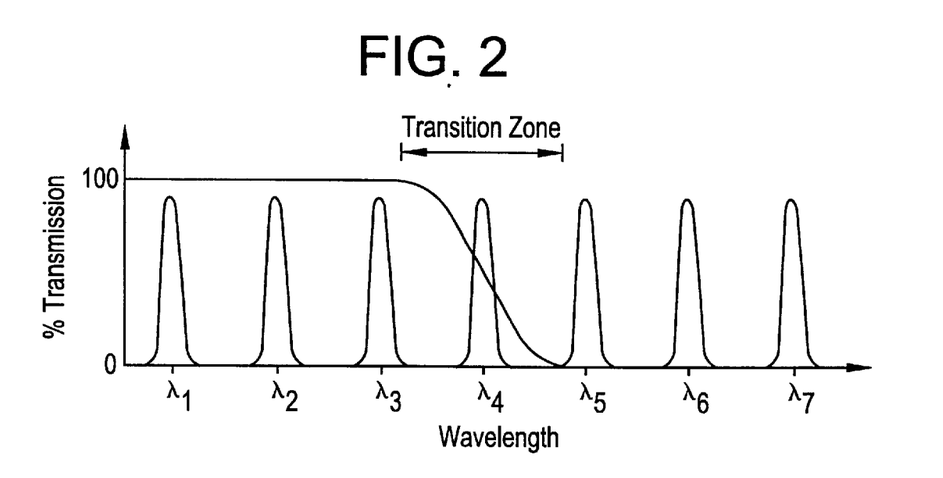
FIG. 2 is a graph illustrating the transmission/reflection characteristics of an actual edge filter.

Wavelength divisions multiplexers are used in optical communication networks to combine various optical signals (channels) carried by two or more optical wavelengths into a single, common carrier (for example, an optical waveguide such as a single fiber). Wavelength division demultiplexers are used in optical communication circuits to separate a plurality of signals transmitted on a common carrier based upon the wavelength of the light onto which the signal is modulated. Wavelength division multiplexers and demultiplexers typically include various combinations of optical elements for performing the combination and separation function respectively. The most common of such components are band edge dichroic filters, which reflect light having wavelengths above or below a certain characteristic wavelength into a first transmission path while allowing the remaining light (i.e. the light having wavelengths below or above the characteristic wavelength) to be transmitted through the band edge filter into a second transmission path. Such edge filters are not ideal in that they have a transition zone surrounding the characteristic wavelength. See, for example, FIG. 1, which shows the characteristics of a hypothetical ideal band edge filter $F_1$ that does not exist or is otherwise extremely expensive to create, and FIG. 2, showing the characteristics of an actual band edge filter $F_2$ as commonly used in these types of devices. Incident light having a wavelength in the transition zone (e.g. $\lambda_4$) is partially reflected and partially transmitted. When a band edge filter only partially transmits or reflects incident light that is supposed to be entirely transmitted or reflected, the band edge filter reduces the intensity of the light signal that is transmitted through the intended transmission path while introducing noise into the other path (i.e. transmission path). To avoid such signal loss and noise, either the separation between the channels must be large enough so that no channels fall within the transition zone of the filter, or the filter must be nearly ideal so as to have a transition zone smaller than the channel separation. To accommodate more signals on a single optical fiber trunk line, designers must decrease channel (i.e. wavelength) separation, which makes the non-ideal band edge filters less practical for use in a wavelength division multiplexers and demultiplexers.

The following description of prior art is directed to both multiplexers and demultiplexers, because these devices are similar to one another and generally a multiplexer will function as a demultiplexer when the input and output are reversed so as to separate (with a demultiplexer) instead of combining (with a multiplexer) different wavelength signals.

Figure 3:
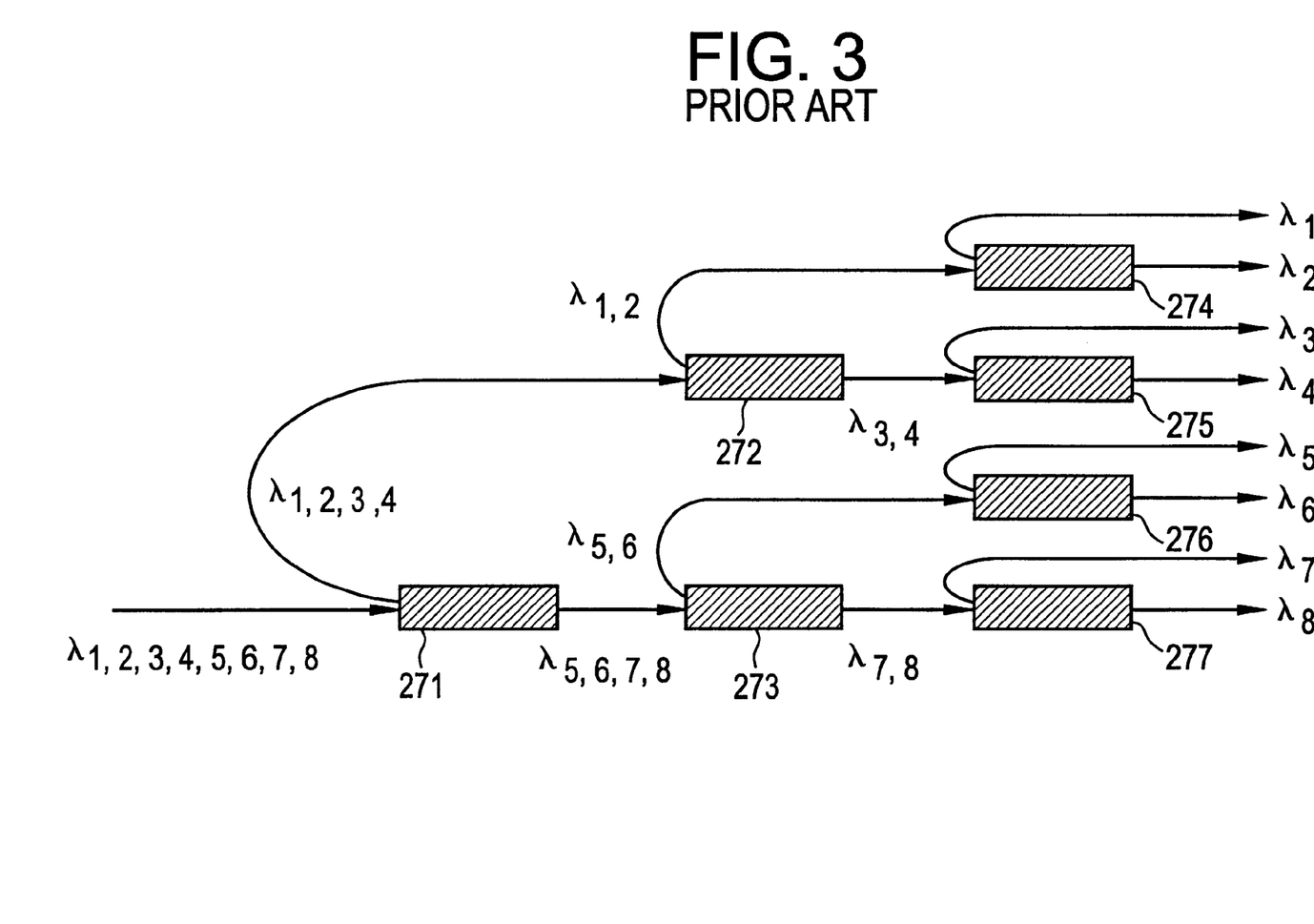
FIG. 3 is an optical system diagram in schematic form of a first prior art wavelength division demultiplexer.

U.S. Pat. No. 5,652,814 issued to Pan et al. discloses a wavelength division demultiplexer made up entirely of such band edge filters. This demultiplexer is shown in FIG. 3. As illustrated, a first filter 271 reflects signals having wavelengths $\lambda_1$ through $\lambda_4$ while transmitting signals having wavelengths $\lambda_5$ through $\lambda_8$. A second filter 272 receives signals having wavelengths $\lambda_1$ through $\lambda_4$ and reflects signals having wavelengths $\lambda_1$ and $\lambda_2$ while transmitting signals having wavelengths $\lambda_3$ and $\lambda_4$. Similarly, a third filter 273 receives signals having wavelengths $\lambda_5$ through $\lambda_8$ and reflects signals having wavelengths $\lambda_5$ and $\lambda_6$ while transmitting signals having wavelengths $\lambda_7$ and $\lambda_8$. Additional band edge filters 274 through 277 are provided as a final separation stage. Because the band edge filters are not ideal, the demultiplexer disclosed in Pan et al. would exhibit large levels of signal loss and crosstalk, particularly when the channel separation is small.

Figure 4:
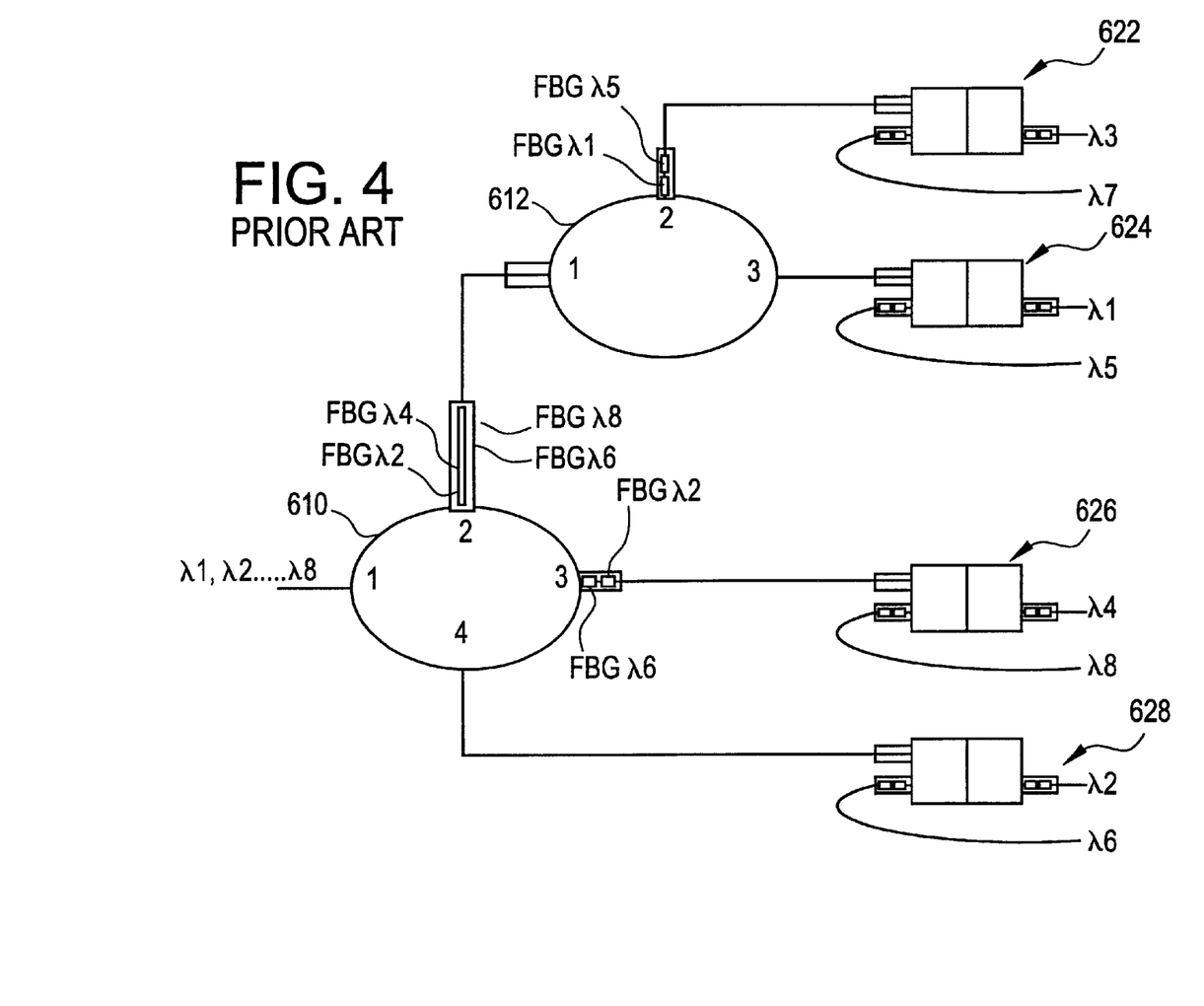
FIG. 4 is an optical system diagram in schematic form of a second prior art wavelength division demultiplexer.

To overcome these difficulties, wavelength division demultiplexers have been constructed with wavelength channel dropping components that include a combination of an optical circulator and various fiber Bragg gratings (FBGs). An example of such a demultiplexer is disclosed in U.S. Pat. No. 5,754,718 issued to Duck et al. This demultiplexer is illustrated in FIG. 4. As shown at the left side of FIG. 4, eight channels having wavelengths $\lambda_1$ through $\lambda_8$ are transmitted into port 1 of an optical circulator 610. All these signals are transmitted out of circulator 610 at port 2. These signals are then passed through the four FBGs that are configured to reflect the signals of non-adjacent wavelengths $\lambda_2$, $\lambda_4$, $\lambda_6$, and $\lambda_8$ back into port 2 of optical circulator 610. The remaining non-adjacent wavelengths are transmitted into port 1 of a second optical circulator 612. First circulator 610 transmits the signals of wavelengths $\lambda_2$, $\lambda_4$, $\lambda_6$, and $\lambda_8$, which are reflected into port 2, out of port 3. Two FBGs reflect wavelengths $\lambda_2$ and $\lambda_6$ and provided at port 3 of optical circulator 610, reflect signals having wavelengths $\lambda_2$ and $\lambda_6$ back into port 3 of optical circulator 610. Optical circulator 610 transmits these signals from port 4. Signals of wavelengths $\lambda_4$ and $\lambda_8$, however, which exit port 3 of circulator 610, are transmitted through the FBGs to a band edge filter 626. Band edge filter 626 transmits signals of wavelength $\lambda_4$ and reflects signals of wavelength $\lambda_8$ (signals $\lambda_5$, $\lambda_6$, and $\lambda_7$ are already removed from the optical path). Similarly, a band edge filter 628 separates signals of wavelengths $\lambda_2$ and $\lambda_6$, which exit port 4 of circulator 610. Optical circulator 612 and band edge filters 622 and 624 similarly separate the signals of wavelengths $\lambda_1$, $\lambda_3$, $\lambda_5$, and $\lambda_7$. As will be apparent, the wavelengths of the signals transmitted to each of band edge filters 622 through 628 are not in adjacent channels. Therefore, any transition zone present in band edge filters 622 through 628 does not necessarily degrade the strength of the signals or the ability to separate the signals based on their wavelengths.

While the wavelength division demultiplexer shown in FIG. 4 overcomes the above noted problems relating to channel separation using band edge filters, the construction of such a demultiplexer is quite expensive due to the very large number of FBGs and other necessary optical components. In addition, the demultiplexer shown in FIG. 4 is designed to separate eight optical channels. If the number of channels to be separated were increased, the demultiplexer would need to be substantially redesigned.

U.S. Pat. No. 5,748,350 is directed to both wavelength division multiplexers and demultiplexers. The multiplexers are illustrated, for example, in FIGS. 1A, and 6A of this patent. FIGS. 7A and 7B illustrate 4n×1 wavelength division multiplexers. FIGS. 8A and 8B of this patent illustrate 4n×1 wavelength division demultiplexers, while FIGS. 9, 10A and 10B show devices that function as wavelength division multiplexers and demultiplexers. These multiplexers and demultiplexers utilize multi port optical circulators, fiber Bragg gratings and band pass wavelength division couplers. The multiplexers disclosed in this reference require fiber Bragg gratings for more than 50% of the optical channels, and typically, optical bandpass filters for each of the optical channels to be multiplexed. That is, a separated bandpass coupler is required for each channel.

As stated above, an exemplary multiplexer is shown schematically in FIG. 6A of that reference. In this multiplexer the multiple fiber Bragg gratings are inserted directly after the optical circulator and are used to direct particular wavelengths of light to specific ports of the optical circulator. Different wavelength channels transmitted by the specific circulator ports interleaved, as shown in FIGS. 2F and 2G, so that the spectral edges of the bandpass devices will not coincide with any optical channel to be multiplexed. The 12 channel multiplexer as described in FIG. 6A utilizes 21 optical components. These components are: one optical circulator, twelve filtering elements, and eight fiber Bragg gratings. Because every optical component introduces impairments (including optical and polarization dependent losses) into the system, it would be desirable to minimize the number of optical components and, therefore to increase the efficiency of multiplexers and demultiplexers.

SUMMARY OF THE INVENTION

It is an object of the present invention to provide a wavelength division demultiplexer that is less expensive to manufacture than most prior systems and that has little, if any, signal loss. To achieve these and other objects and advantages, the wavelength division demultiplexer of the present invention comprises a channel dropping component for receiving optical signals transmitted through a plurality of optical channels. The channels are defined by successively different light wavelength bands at intervals ranging between a first channel having the lowest wavelength band to a last channel having the highest wavelength band. The channel dropping component separates at least one channel having a wavelength band intermediate the lowest wavelength band and the highest wavelength band. The demultiplexer further comprises an edge filter for separating optical signals received from the channel dropping component that have wavelengths below the intermediate wavelength band from optical signals having wavelengths above the intermediate wavelength band. The separated optical signals are transmitted from the edge filter in two different optical paths. The demultiplexer further comprises a channel separator for separating optical signals from one another that are transmitted in at least one of the optical paths.

Another object of the present invention is to provide a wavelength division demultiplexer that has a scaleable design to enable separation of differing numbers of channels without requiring substantial redesign of the demultiplexer. To achieve this and other objects and advantages, an optical demultiplexer is provided for separating optical signals in n channels (where n is an even integer greater than 4). The channels are defined by successively different light wavelength bands at intervals ranging between a first channel having the lowest wavelength band to a last channel having the highest wavelength band. The demultiplexer, according to one aspect of the invention, comprises initial separation stage and (n/2—2) secondary separation stages. The initial separation stage includes a channel dropping component and an edge filter. The channel dropping component receives optical signals transmitted through all n optical channels, and drops two channels having wavelength bands intermediate the lowest wavelength band and the highest wavelength band of the received signals. The edge filter separates optical signals received from the channel dropping component that have wavelengths below the lowest of the dropped intermediate wavelength bands from optical signals having wavelengths above the highest of the dropped intermediate wavelength bands. The edge filter transmits the separated optical signals having wavelengths below the lowest of the dropped intermediate wavelength bands in a first transmission path and transmits the separated optical signals having wavelengths above the highest of the dropped intermediate wavelength bands in a second transmission path.

Each of the secondary separation stages includes a channel dropping component and an edge filter. The channel dropping component receives optical signals in a subset of the n total channels and drops at least one channel having a wavelength band intermediate the lowest wavelength band and the highest wavelength band of the channels received. The edge filter is positioned to receive the optical signals that are transmitted from the channel dropping component. The edge filter separates the received optical signals by transmitting signals having a wavelength greater than the wavelength band of the at least one channel dropped by the channel dropping component into a first transmission path and transmitting signals having a wavelength less than the wavelength band of the at least one channel dropped by the channel dropping component into a second transmission path. The secondary stages are connected to one another or to the initial separation stage such that the channel dropping component for a given secondary separation stage is connected to a first or second transmission path from an edge filter of a preceding separation stage.

Additional features and advantages of the invention will be set forth in the detailed description which follows, and in part will be readily apparent to those skilled in the art from that description, or recognized by practicing the invention as described in the detailed description which follows the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numerals will be used throughout the drawings to refer to the same or like parts.

Because of the need to utilize optical circulators or the like to separate signals in adjacent channels prior to transmittal to a band edge filter, band edge filters had previously typically been employed at the last stage of signal separation. In general, band edge filters are much less expensive than optical circulators and FBGs (Fiber Bragg Gratings). As described below, the following embodiments utilize edge filters for separating groups of signals from one another at earlier stages in the demultiplexer, but without introducing signal loss by attempting to separate signals in adjacent channels, as would the demultiplexer disclosed in U.S. Pat. No. 5,652,814 and shown in FIG. 3.

Figure 5:
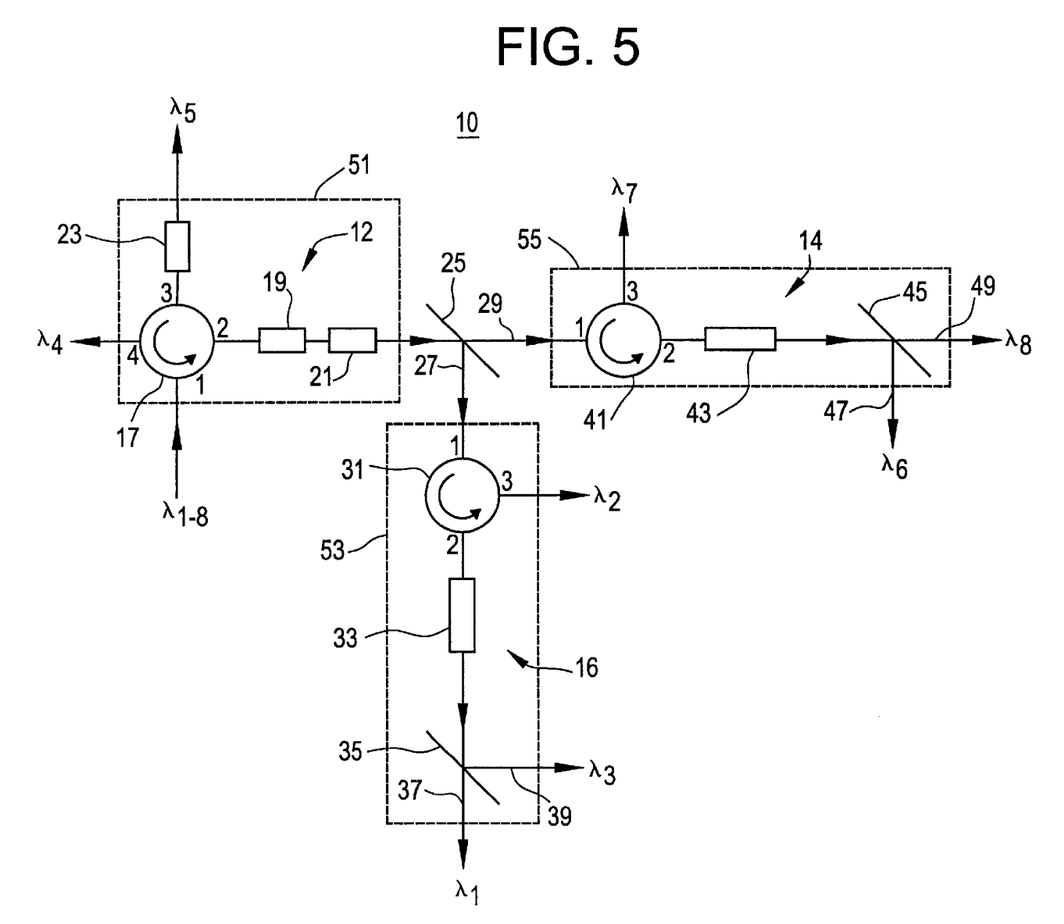
FIG. 5 is an optical system diagram in schematic form of a wavelength division demultiplexer constructed in accordance with a first embodiment of the present invention.

An exemplary embodiment of the wavelength division demultiplexer of the present invention is shown in FIG. 5 and is designated generally throughout by reference numeral 10. The wavelength division demultiplexer 10 includes a channel dropping component 12 for receiving optical signals transmitted through a plurality of optical channels, an edge filter 25 for separating optical signals received from channel dropping component 12, and a signal separator (53, 55). The edge filter may be a thin film filter, a grating filter, fused fiber, bulk diffraction grating, planar waveguide filter, or any other optical band filter. The channels are defined by successively different light wavelength bands at intervals ranging between a first channel having the lowest wavelength band to a last channel having the highest wavelength band. The wavelength bands are 0.05 nm to 65 nm wide and preferably 0.04 nm to 1.6 nm and even more preferably 0.5 nm to 1 nm wide. The optical channels have frequency spacings of 1 GHz to 8000 GHz. It is preferred that the frequency spacings be 10 GHz to 200 GHz.

In general, channel dropping component 12 receives a plurality of channels (eight channels $\lambda_1$ through $\lambda_8$ in FIG. 5) and drops at least one channel having a wavelength band (e.g., $\lambda_4$, $\lambda_5$) intermediate the lowest wavelength band ($\lambda_1$) and the highest wavelength band ($\lambda_8$). Edge filter 25 separates optical signals received from channel dropping component 12 that have wavelengths below the intermediate wavelength band from optical signals having wavelengths above the intermediate wavelength band. Edge filter 25 transmits the separated optical signals in two different optical paths (27, 29). Channel separator (53, 55) separates optical signals from one another that are transmitted in these optical paths (27, 29).

As broadly described herein, a "channel dropping component" may include any single optical element or arrangement of optical elements that can receive at least three channels and drop at least one discrete channel that has a wavelength intermediate those of the other received channels. Under such a definition, a channel dropping component does not include an edge filter since an edge filter could not receive optical signals in at least three channels and separate an optical signal having a wavelength intermediate the wavelengths of the other received channels. On the other hand, a channel dropping component could differ from that specifically disclosed below as the preferred implementation. For example, the channel dropping component may include an optical coupler as commonly used in optical add/drop components.

As embodied herein and depicted in FIG. 5, channel dropping component 12 preferably includes an optical circulator 17, and at least one fiber Bragg grating (FBG) (19, 21, and 23). Preferably, optical circulator 17 has three or four ports. As with all optical circulators, optical circulator 17 receives optical signals in the first port and transmits the optical signals received in the first port out of the second port. If a four-port optical circulator 17 receives any signals in its second port, it transmits the received optical signals out of the third port. If optical circulator 17 receives any signals in its third port, it transmits those signals out of its fourth port. Optical circulators that perform such functions are well-known in the art. Therefore, the detailed construction and operation of such optical circulators will not be described any further.

FBGs suited for use in the present invention are also well-known in the art. In general, when used in either multiplexers or demultiplexers, FBGs either transmit or reflect light propagating through the fiber, such at a specified wavelength is reflected back in the direction from which the light originated and the rest of the light is propagated by the optical waveguide. In the embodiment shown in FIG. 5, FBG 19 is designed to reflect light wavelength of $\lambda_4$, while FBG 21 is designed to reflect light of wavelength of $\lambda_5$. Thus, optical signals in channels having wavelengths of $\lambda_4$ and $\lambda_5$, are redirected back (i.e. reflected) into the second port of optical circulator 17 while optical signals having wavelengths $\lambda_1$, $\lambda_2$, $\lambda_3$, $\lambda_6$, $\lambda_7$, and $\lambda_8$ are transmitted through FBGs 19 and 21 to edge filter 25. When the redirected channels $\lambda_4$ and $\lambda_5$ are contiguous wavelength channels, one single FBG reflecting both wavelength bands can be used in place of the two FBGs 19 and 21.

Channel dropping component 12 also includes a third FBG 23 coupled to the third port of optical circulator 17 for redirecting optical signals having a wavelength of $\lambda_4$ transmitted from the third port back into the third port, while allowing optical signals having a wavelength of $\lambda_5$ to transmit through FBG 23. Thus, channel dropping component 12 drops the $\lambda_4$ channel out of the fourth port of optical circulator 17 and the $\lambda_5$ channel out the third port via FBG 23.

As will be described further below, by utilizing an edge filter to separate optical signals prior to further separation by the signal separator(s) (53, 55), optical demultiplexer 10 may be constructed with fewer components and thus, at a much lower cost than prior demultiplexers. By dropping intermediate channels (e.g. $\lambda_4$ and $\lambda_5$) using channel dropping component 12 prior to introducing the optical signals in the remaining channels to edge filter 25, and by selecting a cut-off wavelength for edge filter 25 in between the wavelengths of the dropped channels, an optical demultiplexer is provided that separates channels that would otherwise fall within the transition zone of an edge filter. Thus, edge filter 25 may separate the received signals cleanly without signal loss or introducing noise. In the example shown in FIG. 5, edge filter 25 separates the received signals while directing signals having wavelengths less than the lowest of the dropped intermediate wavelengths ($\lambda_4$) into a first optical path 27, while directing signals having wavelengths greater than the highest of the dropped intermediate wavelengths ($\lambda_5$) into a second optical path 29.

Signal separator 53 preferably includes a channel dropping component 16 and an edge filter 35. Channel dropping component 16 may include a three-port optical circulator 31 having its first port coupled to first optical path 27, and FBG 33 coupled to the second port of circulator 31. FBG 33 reflects back light, which has a wavelength that is intermediate, the wavelengths of the optical signals transmitted on first optical path 27. Thus, for example, when optical signals having wavelengths $\lambda_1$ through $\lambda_3$ are transmitted on first optical path 27, the diffraction wavelength of FBG 33 would be $\lambda_2$. Similarly, the cut-off wavelength of edge filter 35 would also be at $\lambda_2$ so that optical signals having a wavelength of $\lambda_1$ are transmitted through an optical path 37 while optical signals having a wavelength of $\lambda_3$ are transmitted through a different optical path 39.

By providing channel dropping component 16 prior to edge filter 35 and thereby dropping an intermediate wavelength band that would otherwise fall within the transition zone of edge filter 35, edge filter 35 may separate channels without introducing signal loss or noise.

As shown in FIG. 5, demultiplexer 10 may include a second signal separator 55 for separating the channels transmitted from edge filter 25 on first optical path 29. Signal separator 55 has a construction similar to that of signal separator 53. Specifically, signal separator 55 may include a channel dropping component 14 and an edge filter 45. Channel dropping component 14 preferably includes a three-port optical circulator 41 having its first port coupled to optical path 29, and FBG 43 coupled to the second port of circulator 41. As with signal separator 53, FBG 43 has a "reflection wavelength" corresponding to an intermediate wavelength of the channels transmitted on second optical path 29, and edge filter 45 has a cut-off wavelength corresponding to the same intermediate wavelength. Thus, as shown in FIG. 5, FBG 43 redirects optical signals having wavelengths of $\lambda_7$ back into the second port of optical circulator 41 such that these redirected optical signals are transmitted from the third port of circulator 41. The remaining channels transmitted on the second optical path 29 have wavelengths of $\lambda_6$ and $\lambda_8$ and are cleanly separated from one another by edge filter 41 without the introduction of noise nor signal loss to these optical signals.

Although a specific implementation for a signal separator is described above, a "signal separator" may be constructed using any one optical element or combination of optical elements capable of separating optical signals. For example, a signal separator may include any one or combination of band edge filters, band pass filters, optical circulators, optical couplers, or FBGs.

Figure 6:
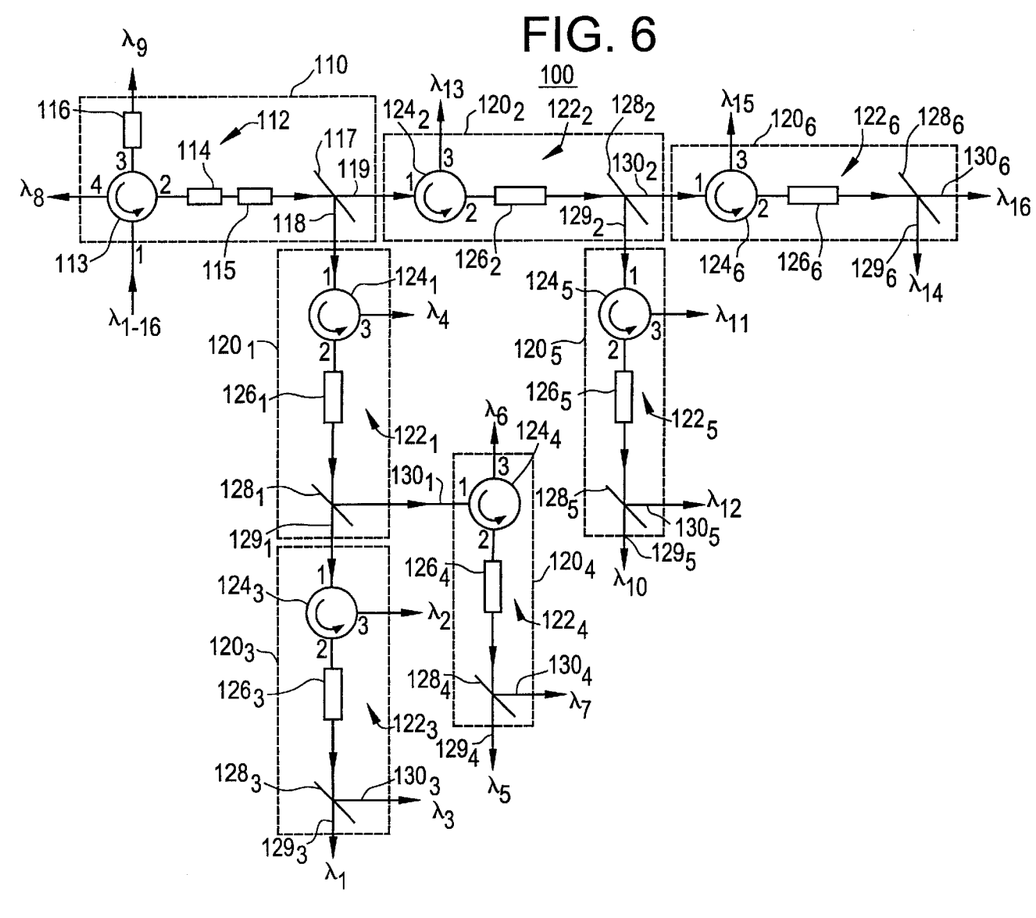
FIG. 6 is an optical system diagram in schematic form of a wavelength division demultiplexer constructed in accordance with a second embodiment of the present invention.

As an additional/alternate embodiment of the invention, as embodied herein, a wavelength division demultiplexer is provided for separating optical signals transmitted in n channels (where n is an even integer greater than 4). The second embodiment is described below to illustrate the scalability of the inventive demultiplexer design. Thus, the first embodiment represents an example of the second embodiment when n is equal to eight. As a further example of the demultiplexer according to the second embodiment, a demultiplexer 100 is shown in FIG. 6, for demultiplexing 16 channels.

Demultiplexer 100 includes an initial separation stage 110 and (n/2—2) secondary separation stages 120. Because in the example shown in FIG. 6, where n=16, channels, there are six secondary separation stages ($120_1$ through $120_6$). As will be further explained below, the number of secondary stages may be varied in accordance with the number of channels to be separated. Thus, if more than sixteen channels need to be separated, additional secondary stages may be added, and if fewer channels need to be separated, secondary stages may be eliminated. As also described below, each of the secondary stages has an identical configuration with the exception of the wavelengths of the channels it must separate. The secondary stages can be built as plug-in modules (i.e. unitary sub-assemblies), thus lowering the cost of manufacturing assembly. In addition, by adding more modules, one may expand the number of wavelengths (and thus the number of channels) that the end user wants to demultiplex.

Initial separation stage 110 includes a channel dropping component 112 for receiving optical signals transmitted through all n optical channels, and an edge filter 117. Channel dropping component 112 drops two channels having wavelength bands (e.g., $\lambda_8$ and $\lambda_9$) intermediate the lowest wavelength band ($\lambda_1$) and the highest wavelength band ($\lambda_{16}$).

Channel dropping component 112 of initial separation stage 110 includes an optical circulator 113 having at least a first port, a second port, a third port, and a fourth port. Optical circulator 113 receives optical signals in the first port and transmits the optical signals received in the first port out of the second port.

In addition, channel dropping component 112 includes a first FBG 114 coupled to the second port of optical circulator 113 for redirecting optical signals having wavelengths ($\lambda_8$) corresponding to a reflection wavelength of first FBG 114 back into the second port of optical circulator 113 while transmitting optical signals having wavelengths not corresponding to the reflection wavelength of first FBG 114 to a second FBG 115.

Second FBG 115 is coupled to first FBG 114 for redirecting optical signals having wavelengths ($\lambda_9$) corresponding to a reflection wavelength of second FBG 115 back through first FBG 114 into the second port of optical circulator 113, while transmitting optical signals having wavelengths not corresponding to the reflection wavelength of second FBG 115 to edge filter 117. Optical circulator 113 transmits the optical signals that are received in the second port, out of the third port. When the wavelengths of the channels redirected by the FBGs 114 and 115 are contiguous (as in the example of FIG. 6), the FBGs 114 and 115 may be replaced by a single FBG that reflects both wavelength bands.

Channel dropping component 112 also includes a third FBG 116 coupled to the third port of optical circulator 113 for redirecting optical signals having a wavelength ($\lambda_8$) corresponding to a diffraction wavelength of third FBG 116 back into the third port of optical circulator 113, while transmitting optical signals having wavelengths not corresponding to the diffraction wavelength of third FBG 116. Optical circulator 113 transmits the optical signals received in the third port out of the fourth port.

Edge filter 117 separates optical signals received from channel dropping component 112 that have wavelengths (e.g., $\lambda_{1\ through\ 7}$) below the lowest of the dropped intermediate wavelength bands ($\lambda_8$) from optical signals having wavelengths (e.g., $\lambda_{10\ through\ 16}$) above the highest of the dropped intermediate wavelength bands ($\lambda_9$). Edge filter 117 transmits the separated optical signals having wavelengths ($\lambda_{1\ through\ 7}$) below the lowest of the dropped intermediate wavelength bands in a first transmission path 118 and transmits the separated optical signals having wavelengths ($\lambda_{10\ through\ 16}$) above the highest of the dropped intermediate wavelength bands in a second transmission path 119.

Secondary separation stages $120_1$ through $120_6$ each include a channel dropping component 122 for receiving optical signals in a subset of the n total channels and for dropping a channel having a wavelength band intermediate the lowest wavelength band and the highest wavelength band of the channels received. Thus, for example, secondary separation stage $120_1$ includes a channel dropping component $122_1$ that drops a channel having a wavelength band ($\lambda_4$) that is intermediate the lowest wavelength band ($\lambda_1$) and the highest wavelength band ($\lambda_7$) of the channels it receives.

Each channel dropping component 122 preferably includes a three-port optical circulator 124 having its first port coupled to a first or second optical path of a preceding secondary or initial stage, and FBG 126 coupled to the second port of circulator 124. FBG 126 has a diffraction wavelength corresponding to the intermediate wavelength to be dropped by channel dropping component 122. The diffraction wavelength of FBG 126 will vary from one secondary separation stage to another.

Each secondary separation stage 120 further includes an edge filter 128 positioned to receive the optical signals that are transmitted from channel dropping component 122. Edge filter 128 separates the received optical signals by transmitting signals having a wavelength greater than the wavelength band of the channel dropped by channel dropping component 122 into a first transmission path 129, and transmitting signals having a wavelength less than the wavelength band of the channel dropped by channel dropping component 122 into a second transmission path 130. Thus, for example, edge filter $128_1$ of secondary separation stage $120_1$ transmits signals having wavelengths $\lambda_{1\ through\ 3}$ into first transmission path $129_1$ and transmits signals having wavelengths $\lambda_{5\ through\ 7}$ into second transmission path $130_1$.

Secondary separation stages 120 are connected to one another or to initial separation stage 110 such that the channel dropping component (122) for a given secondary separation stage 120 is connected to a first or second transmission path (118, 119, 129, 130) from an edge filter (117, 128) of a preceding separation stage (110, 120).

By utilizing edge filters in separation stages upstream of the final separation stages, a demultiplexer may be constructed having a low cost, since doing so eliminates the need for additional optical circulators and/or FBGs, which are more expensive than edge filters. Also, by including a channel dropping component upstream of each edge filter so as to drop channels that would otherwise fall in the transition zones of the edge filters, edge filters may be utilized in initial and nonfinal separation stages without introducing signal loss and noise. For example, channel dropping component 122 drops the channel of wavelength $\lambda_4$, which, as shown in FIG. 2, would otherwise fall within the transition zone of edge filter 128.

Of secondary separation stages $120_1$ through $120_6$, stages $120_1$ and $120_2$ are intermediate separation stages while stages $120_3$ through $120_6$ are final separation stages. Final separation stages are secondary separation stages that receive three adjacent channels and separate all three channels by transmitting the signals of these channels along separate transmission paths. Of the three channels received by any one final separation stage, there are a plurality of optical signals each having one of a first, second, and third wavelength defining adjacent channels where the second wavelength is intermediate the first and third wavelengths.

Each final separation stage includes an optical circulator 124 having at least a first port, a second port, and a third port. Optical circulator 124 receives optical signals in the first port and transmits the optical signals received in the first port out of the second port. The final separation stages also each include FBG 126 coupled to the second port of optical circulator 124 for redirecting optical signals having the second wavelength back into the second port of optical circulator 124, while transmitting optical signals having the first and third wavelengths. Optical circulator 124 transmits the optical signals having the second wavelength, which are received in the second port, out of the third port. The final separation stages each further include an edge filter 128 positioned to receive the optical signals having the first and third wavelengths that are transmitted from FBG 126, and to separate the optical signals having the first wavelength from the optical signals having the third wavelength.

The intermediate stages $120_{1\ through\ 2}$ are secondary stages having substantially the same construction as the final stages $120_{3\ through\ 6}$ except that more channels are transmitted through the intermediate stages. Specifically, the intermediate stages are a component of a wavelength division demultiplexer that separates a plurality of received optical signals in one of n channels, where n is an odd number. For example, as shown in FIG. 6, where n=7, channels of optical signals are received by each intermediate stage $120_{1\ through\ 2}$. Each intermediate stage includes an optical circulator 124 having at least a first port, a second port, and a third port. Optical circulator 124 receives optical signals in the first port and transmits the optical signals received in the first port out of the second port. The intermediate stages further include FBG 126 coupled to the second port of optical circulator 124 for redirecting optical signals in the (n+1)/2 channel (i.e., the fourth of seven received channels) back into the second port of optical circulator 124 while transmitting optical signals in the other channels. Optical circulator 124 transmits the optical signals in the (n+1)/2 channel, which are received in the second port, out of the third port. The intermediate stages further include an edge filter 128 positioned to receive the optical signals in the other channels that are transmitted from FBG 126, and to separate the optical signals in channels 1 through [(n+1)/2]−1 (i.e., channels 1–3 when seven channels are received (n=7)) from those in channels [(n+1)/2]+1 through n (i.e., channels 5 through 7 when seven channels are received (n=7)).

It should be noted that the intermediate separation stages may function slightly differently depending upon the number of signals to be separated, and depending upon the number of final separation stages that are coupled downstream of the intermediate separation stage. For example, if a demultiplexer were to be designed for separating n=14 channels, final stage $120_6$ could simply be eliminated, and the signals output on transmission path $130_2$ would all be in the fourteenth channel ($\lambda_{14}$). Thus, intermediate stage $120_2$ would be modified slightly from the above formula by dropping intermediate channel 13 ($\lambda_{13}$), rather than dropping intermediate channel 12 ($\lambda_{12}$). On the other hand, if the demultiplexer were to only have to demultiplex 12 channels, both final stages $120_5$ and $120_6$ could be eliminated and intermediate stage $120_2$ could be modified so as to drop the eleventh channel prior to separating the tenth channel from the twelfth channel using edge filter $128_2$.

If one wished to design a demultiplexer for separating more channels than the 16 channels shown in FIG. 6, one may simply add additional final stages on the first or second transmission paths 129 and 130 of one of the final stages shown in FIG. 6. For example, if one wished to redesign demultiplexer 100 so as to separate 18 channels, one could simply add a final stage with the first port of its optical circulator coupled to second transmission path 130₆ of secondary separation stage 120₆ while selecting a FBG that would drop the seventeenth channel and selecting an edge filter that would separate the 16th channel from the 18th channel.

Figure 7:
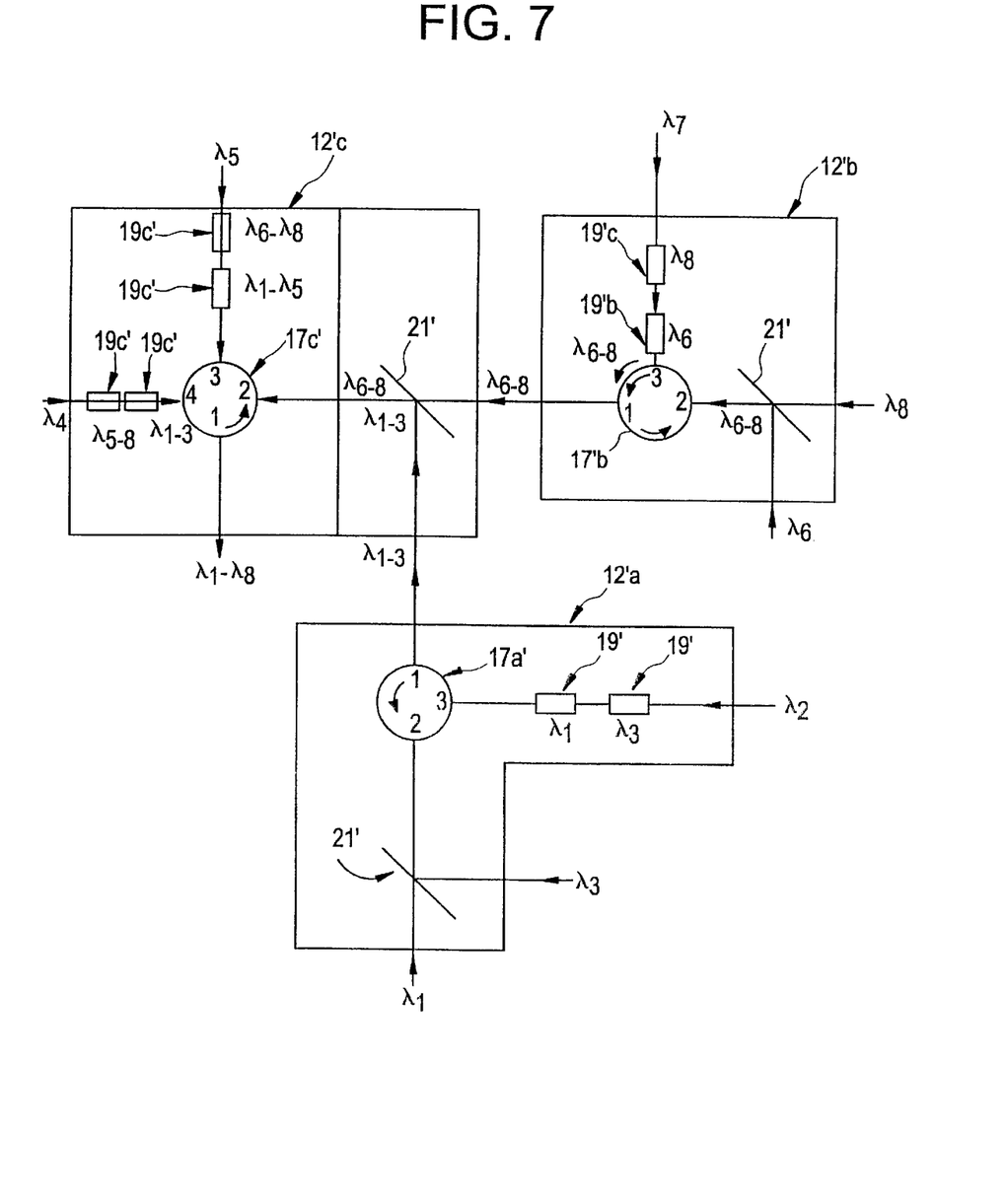
FIG. 7 is an optical system diagram in a schematic form of a wavelength division multiplexer constructed in accordance with a third embodiment of the present invention.

The above described demultiplexers may be modified and used as multiplexers when signals of different wavelengths need to be combined. An example of such a multiplexer is illustrated in FIG. 7 and is similar to the demultiplexer of FIG. 5. This multiplexer combines wavelengths $\lambda_1$ through $\lambda_8$ into a single optical waveguide. As embodied herein and depicted in FIG. 7, multiplexer 10' includes three channel combining components 12'a, 12'b, and 12'c. Each channel combining component 12'a, 12'b, and 12'c preferably includes an optical circulator 17'a, 17'b, 17'c, and at least one, and preferably at least two fiber Bragg gratings (FBG) 19'. Optical circulators 17'a, 17'b, 17'c have three or four ports as illustrated. As stated above, optical circulators receive optical signals in the first port and transmit the optical signals received in the first port out of the second port. In the embodiment shown in FIG. 7, optical signals in channels having wavelengths of $\lambda_1$ and $\lambda_3$ are combined by the edge filter 21', are directed towards the second port of the circulator 17'a and are redirected back into the third port of optical circulator 17'a while the optical signal having wavelength $\lambda_2$ is transmitted through FBGs 19'a to the third port of the circulator 17'a. The optical wavelengths $\lambda_1$ and $\lambda_3$ are reflected by the FBGs 19' and directed towards the third port of circulator 17'a. Therefore, the optical signals in channels having wavelengths of $\lambda_1$ through $\lambda_3$ are combined by the first channel combining component and are transmitted through port 1 of the optical circulator 17'a.

Similarly, optical signals in channels having wavelengths $\lambda_6$, $\lambda_7$, and $\lambda_8$ are combined by channel combining components 12'b and exit through the first port of the circulator 17'b. Channel combining component 12'b includes two FBGs 19'b and a filter 21'. More specifically, the optical signals $\lambda_6$ and $\lambda_8$ are combined by dichroic filter 21' and are transmitted to the input port (port 2) of the optical circulator 17'b. The FBGs 19'b of the second channel adding component 12'b reflect light having wavelengths of $\lambda_6$ and $\lambda_8$ and transmit light having wavelength $\lambda_7$. Thus, optical signals in channels having wavelengths of $\lambda_6$ and $\lambda_8$ are combined by filter 21', are directed towards the second port of the circulator 17'b and are redirected by the FBGs 19' back into the third port of optical circulator 17'. The optical signal having wavelength $\lambda_7$ is transmitted through FBGs 19'b to the third port of the circulator 17'b. Therefore, the optical signals in channels having wavelengths of $\lambda_6$ through $\lambda_8$ are combined by the second channel combining component 12b'.

Channel combining component 12'c includes four FBGs 19'. More specifically, an optical signal of wavelength $\lambda_4$ is directed to one input port of the channel adding component 12'c (port 4) and the optical signal of wavelength $\lambda_5$ is directed through another input port (port 3). Each of the optical signals $\lambda_4$ and $\lambda_5$ are transmitted through a pair of FBGs 19' to ports 4 and 3, respectively, while the optical signals characterized by $\lambda_1$ through $\lambda_3$ and $\lambda_6$ through $\lambda_8$ are combined by a dichroic mirror 21' and are coupled to the second port of the circulator 17'c. The two FBGs 19'c that transmit the optical signal $\lambda_5$ also reflect signals $\lambda_1$ through $\lambda_3$ and $\lambda_6$ through $\lambda_8$ back to the fourth port of the circulator 17c'. Similarly, the two FBGs 19'c that transmit the optical signal $\lambda_4$ reflect signals $\lambda_1$ through $\lambda_3$ and $\lambda_5$ through $\lambda_8$ back to the fourth port of the circulator 17c'. It is noted that the FBGs 19'c of the third channel combining component 12c' are different from the FBGs of the first and second channel combining components 12a' and 12b'. The FBGs 19'c of the third channel combining component 12c' act on bands of wavelengths; they do not reflect light only a single wavelength. For example, one of the FBGs 19' reflects light in wavelengths $\lambda_1$ through $\lambda_3$ while the other FBG reflects light in wavelengths $\lambda_5$ through $\lambda_8$. One advantage of using FBGs that reflect bands of wavelengths is the elimination of multiple single wavelength FBGs and a reduction in the total number of FBGs and other optical components in the multiplexer. It is noted that use of FBGs 19' that reflect bands of wavelengths is advantageous not only in multiplexers, but also in the demultiplexers and also in other wavelength filtering optical devises. The circulator 17'c combines all channels $\lambda_1$ through $\lambda_8$ and outputs them through port number 1. Thus, optical signals of eight different wavelengths ($\lambda_1$ through $\lambda_8$) are multiplexed as shown in FIG. 7.

As will be apparent to those skilled in the art, the basic design of the multiplexers and demultiplexers of the present invention may be used to construct multiplexers and demultiplexers for multiplexing and demultiplexing any number of channels. Given the basic design in the logic employed in determining how many stages to use and which channels to add/drop using the optical circulator and FBG of each stage, one could readily develop a computer program that automatically designs an optical multiplexer and demultiplexer for separating or combining a desired number of channels using the inventive building block components of the present invention.

It will be apparent to those skilled in the art that various modifications and adaptations can be made to the present invention without departing from the spirit and scope of this invention. Thus, it is intended that the present invention cover the modifications and adaptations of this invention, provided they come within the scope of the appended claims and their equivalents.

What is claimed is:

1. A wavelength division demultiplexer for separating a plurality of received optical signals, said demultiplexer comprising:

a channel dropping component for receiving optical signals transmitted through a plurality of optical channels, said channels being defined by successively different light wavelength bands at intervals ranging between a first channel having the lowest wavelength band to a last channel having the highest wavelength band, wherein said channel dropping component separates at least one channel having a wavelength band intermediate said lowest wavelength band and said highest wavelength band;

an edge filter receiving said lowest and said highest wavelengths bands, but not said immediate wavelength band and, separating optical signals received from said channel dropping component that have wavelengths below the intermediate wavelength band from optical signals having wavelengths above the intermediate wavelength band, the separated optical signals being transmitted from said edge filter in two different optical paths; and a channel separator in at least one of said optical paths for separating optical signals from one another, said channel separator comprising (i) an optical circulator with a plurality of ports; and (ii) an edge filter and a reflective filter arranged in series.

2. The optical demultiplexer as defined in claim 1, wherein said channel separator includes a second channel dropping component for receiving the optical signals transmitted in said at least one optical path and for separating optical signals in at least one channel from those channels received on said at least one optical path.

3. The wavelength division multiplexer according to claim 1, wherein said reflective filter is a fiber Bragg grating.

4. A method of demultiplexing a plurality of optical channels, comprising the steps of:

receiving optical signals transmitted through a plurality of optical channels, said channels being defined by successively different light wavelength bands at intervals ranging between a first channel having the lowest wavelength band to a last channel having the highest wavelength band;

providing a channel dropping component for separating at least one channel having a wavelength band intermediate said lowest wavelength band and said highest wavelength band from said lowest and said highest wavelength bands;

providing an edge filter to separate optical signals having wavelengths below the intermediate wavelength band from optical signals having wavelengths above the intermediate wavelength band, the separated optical signals being transmitted from said edge filter in two different optical paths; and separating optical signals transmitted in at least one of said optical paths from one another by utilizing serially arranged edge filter and fiber Bragg grating.

5. The method as defined in claim 4, wherein said step of separating optical signals transmitted in at least one of said optical paths from one another includes the substep of providing a second channel dropping component for receiving the optical signals transmitted in one of said optical paths, and for separating optical signals in at least one channel from those channels received on the optical path.

6. A wavelength division demultiplexer for separating a plurality of received optical signals that have one of at least a first, second, and third wavelength where said second wavelength is intermediate said first and third wavelengths, said first, second, and third wavelengths defining adjacent channels, said demultiplexer comprising:

an optical circulator having at least a first port, a second port, and a third port, said optical circulator receives optical signals in said first port and transmits the optical signals received in said first port out of said second port;

a fiber Bragg grating coupled to said second port of said optical circulator for redirecting optical signals having said second wavelength back into said second port of said optical circulator while transmitting optical signals having said first and third wavelengths, wherein said optical circulator transmits the optical signals having said second wavelength, which are received in said second port, out of said third port;

an edge filter positioned to receive the optical signals having said first and third wavelengths that are transmitted from said fiber Bragg grating, but not said second wavelength, said edge filter separates the optical signals having said first wavelength from the optical signals having said third wavelength; and a channel separator optically coupled to said edge filter, said channel separator comprising (i) a second optical circulator having a plurality of ports; and (ii) an edge filter and a fiber Bragg grating arranged in series.

7. The wavelength division demultiplexer according to claim 6 wherein said edge filter is a thin film filter.

8. The wavelength division demultiplexer according to claim 6 wherein said edge filter is a grating.

9. A component for a wavelength division demultiplexer for separating a plurality of received optical signals in one of n channels where n is an odd number, said component comprising:

an optical circulator having at least a first port, a second port, and a third port, said optical circulator receives optical signals in said first port and transmits the optical signals received in said first port out of said second port;

a fiber Bragg grating coupled to said second port of said optical circulator for redirecting optical signals in the (n+1)/2 channel back into said second port of said optical circulator while transmitting optical signals in the other channels, wherein said optical circulator transmits the optical signals in the (n+1)/2 channel, which are received in said second port, out of said third port; and an edge filter positioned to receive the optical signals in the other channels that are transmitted from said fiber Bragg grating, said other channels being channels other than the (n+1)/2 channel, said edge filter separates separating the optical signals in channels 1 through (n+1)/2−1 from those in channels (n+1)/2+1 through n.

10. A wavelength division demultiplexer comprising:

a component for a wavelength division demultiplexer for separating a plurality of received optical signals in one of n channels where n is an odd number, said component including an optical circulator having at least a first port, a second port, and a third port, said optical circulator receives optical signals in said first port, a second port, and a third port, said optical circulator receives optical signals in said first port and transmits the optical signals received in said first port out of said second port;

a fiber Bragg grating coupled to said second port of said optical circulator for redirecting optical signals in the (n+1)/2 channel back into said second port of said optical circulator while transmitting optical signals in the other channels, wherein said optical circulator transmits the optical signals in the (n+1)/2 channel, which are received in said second port, out of said third port; and an edge filter positioned to receive the optical signals in the other channels that are transmitted from said fiber Bragg grating, said edge filter separates the optical signals in channels 1 through [(n+1)/2]−1 from those in channels [(n+1)/2]+1 through n.

11. The wavelength division demultiplexer of claim 10 and further including:

a first signal separation stage component for receiving the optical signals in channels 1 through (n+1)/2−1 from said edge filter and separating the optical signals in each of the channels from one another; and a second signal separation stage component for receiving the optical signals in channels (n+1)/2+1 through n from said edge filter and separating the optical signals in each of the channels from one another.

12. The wavelength division demultiplexer of claim 10 wherein said first signal separation stage component includes:

an optical circulator having at least a first port, a second port, and a third port, said optical circulator receives optical signals in channels 1 through (n+1)/2−1 in said first port and transmits the optical signals received in said first port out of said second port; and a fiber Bragg grating coupled to said second port of said optical circulator for redirecting optical signals in a selected channel having a wavelength halfway between that of channels 1 and (n+1)/2−1 back into said second port of said optical circulator while transmitting optical signals in the other channels, wherein said optical circulator transmits the optical signals in the selected channel, which are received in said second port, out of said third port.

13. The wavelength division demultiplexer of claim 12, wherein said second signal separation stage component includes:

an optical circulator having at least a first port, a second port, and a third port, said optical circulator receives optical signals in channels (n+1)/2+1 through n in said first port and transmits the optical signals received in said first port out of said second port; and a fiber Bragg grating coupled to said second port of said optical circulator for redirecting optical signals in a selected channel having a wavelength halfway between that of channels (n+1)/2+1 and n back into said second port of said optical circulator while transmitting optical signals in the other channels, wherein said optical circulator transmits the optical signals in the selected channel, which are received in said second port, out of said third port.

14. An optical demultiplexer for separating optical signals in n channels where n is an even integer greater than 4, said channels being defined by successively different light wavelength bands at intervals ranging between a first channel having the lowest wavelength band to a last channel having the highest wavelength band, said demultiplexer comprising:

an initial separation stage including:
a channel dropping component receiving optical signals transmitted through all n optical channels, said channel dropping component drops two channels having wavelength bands intermediate said lowest wavelength band and said highest wavelength band, and an edge filter separating optical signals received from said channel dropping component that have wavelengths below the lowest of the dropped intermediate wavelength bands from optical signals having wavelengths above the highest of the dropped intermediate wavelength bands, said edge filter transmits the separated optical signals having wavelengths below the lowest of the dropped intermediate wavelength bands in a first transmission path and transmits the separated optical signals having wavelengths above the highest of the dropped intermediate wavelength bands in a second transmission path; and a total of n/2—2 secondary separation stages each including:
a channel dropping component for receiving optical signals in a subset of the n total channels and dropping channels having a wavelength band intermediate the lowest wavelength band and the highest wavelength band of the channels received, (i) a fiber Bragg grating optically coupled to said channel dropping component, and (ii) an edge filter arranged in series, said edge filter separates the received optical signals by transmitting signals having a wavelength greater than the wavelength band of the channel dropped by said channel dropping component into a first transmission path and transmitting signals having a wavelength less than the wavelength band of the channel dropped by said channel dropping component into a second transmission path, wherein said secondary stages are connected to one another or to said initial separation stage such that the channel dropping component for a given secondary separation stage is connected to a first or second transmission path from an edge filter of a preceding separation stage.

15. The optical demultiplexer as defined in claim 14, wherein said channel dropping component of said initial separation stage includes:

an optical circulator having at least a first port, a second port, a third port, and a fourth port, said optical circulator receives optical signals in said first port and transmits the optical signals received in said first port out of said second port;

a first fiber Bragg grating coupled to said second port of said optical circulator for redirecting optical signals having wavelengths corresponding to a diffraction wavelength of said first grating back into said second port of said optical circulator while transmitting optical signals having wavelengths not corresponding to the diffraction wavelength of said first grating;

a second fiber Bragg grating coupled to said first fiber Bragg grating for redirecting optical signals having wavelengths corresponding to a diffraction wavelength of said second grating back through said first grating into said second port of said optical circulator while transmitting optical signals having wavelengths not corresponding to the diffraction wavelength of said second grating, wherein said optical circulator transmits the optical signals that are received in said second port, out of said third port;

a third fiber Bragg grating coupled to said third port of said optical circulator for redirecting optical signals having a wavelength corresponding to a diffraction wavelength of said third grating back into said third port of said optical circulator while transmitting optical signals having wavelengths not corresponding to said diffraction wavelength of said third grating, wherein said optical circulator transmits the optical signals received in said third port out of said fourth port; and wherein the diffraction wavelengths of said first and third gratings are the same and wherein the diffraction wavelengths of the first, second, and third gratings correspond to the two intermediate wavelength bands of the two dropped channels.

16. The optical demultiplexer as defined in claim 14, wherein said channel dropping component of each of said secondary separation stages includes:

an optical circulator having a first port, a second port, and a third port, said optical circulator receives optical signals in said first port and transmits the optical signals received in said first port out of said second port; and wherein said fiber Bragg grating is coupled to said second port of said optical circulator and re-directs optical signals having a wavelength corresponding to the diffraction wavelength of said grating back into said second port of said optical circulator while transmitting optical signals having wavelengths not corresponding to the diffraction wavelength of said grating, wherein said optical circulator transmits the redirected optical signals that are received in said second port, out of said third port, and wherein the diffraction wavelength of said grating corresponds to that of the dropped channel.

17. An optical demultiplexer for separating optical signals in n channels where n is an even integer greater than 4, said channels being defined by successively different light wavelength bands at intervals ranging between a first channel having the lowest wavelength band to a last channel having the highest wavelength band, said demultiplexer comprising:

an initial separation stage including:
- a channel dropping component receiving optical signals transmitted through all n optical channels, said channel dropping component drops two channels having wavelength bands intermediate said lowest wavelength band and said highest wavelength band,
- a fiber Bragg grating optically coupled to said channel dropping component; and
- an edge filter optically coupled to said fiber Bragg grating, said edge filter separating optical signals received from said channel dropping component that have wavelengths below the lowest of the dropped intermediate wavelength bands from optical signals having wavelengths above the highest of the dropped intermediate wavelength bands, said edge filter transmits the separated optical signals having wavelengths below the lowest of the dropped intermediate wavelength bands in a first transmission path and transmits the separated optical signals having wavelengths above the highest of the dropped intermediate wavelength bands in a second transmission path; and n/2-2 secondary separation stages each including:
- a channel dropping component for receiving optical signals in a subset of the n total channels and dropping channels having a wavelength band intermediate the lowest wavelength band and the highest wavelength band of the channels received,
- a fiber Bragg grating optically coupled to said channel dropping component, said fiber Bragg grating of said secondary separation stage being characterized by a diffraction wavelength, and
- an edge filter having a characteristic wavelength and being positioned to receive the optical signals that are transmitted from said grating, said edge filter separates the received optical signals by transmitting signals having a wavelength greater than the wavelength band of the channel dropped by said channel dropping component into a first transmission path and transmitting signals having a wavelength less than the wavelength band of the channel dropped by said channel dropping component into a second transmission path, wherein said secondary stages are connected to one another or to said initial separation stage such that the channel dropping component for a given secondary separation stage is connected to a first or second transmission path from an edge filter of a preceding separation stage and, wherein, for each secondary separation stage, the diffraction wavelength of said secondary stage fiber Bragg grating generally corresponds to the characteristic wavelength of said secondary stage edge filter of said secondary separation stage.

18. An optical demultiplexer for separating optical signals in n channels where n is an even integer greater than 4, said channels being defined by successively different light wavelength bands at intervals ranging between a first channel having the lowest wavelength band to a last channel having the highest wavelength band, said demultiplexer comprising:

an initial separation stage including:
- a first fiber Bragg grating and a second fiber Bragg grating each having a predetermined diffraction wavelength;
- a channel dropping component receiving optical signals transmitted through all n optical channels, said channel dropping component drops two channels having wavelength bands intermediate said lowest wavelength band and said highest wavelength band, and
- an edge filter having a characteristic wavelength, said edge filter separating optical signals received from said channel dropping component that have wavelengths below the lowest of the dropped intermediate wavelength bands from optical signals having wavelengths above the highest of the dropped intermediate wavelength bands, said edge filter transmits the separated optical signals having wavelengths below the lowest of the dropped intermediate wavelength bands in a first transmission path and transmits the separated optical signals having wavelengths above the highest of the dropped intermediate wavelength bands in a second transmission path; and n/2—2 secondary separation stages each including:
- a channel dropping component for receiving optical signals in a subset of the n total channels and dropping channels having a wavelength band intermediate the lowest wavelength band and the highest wavelength band of the channels received, and
- an edge filter positioned to receive the optical signals that are transmitted from said channel dropping component, said edge filter separates the received optical signals by transmitting signals having a wavelength greater than the wavelength band of the channel dropped by said channel dropping component into a first transmission path and transmitting signals having a wavelength less than the wavelength band of the channel dropped by said channel dropping component into a second transmission path, wherein said secondary stages are connected to one another or to said initial separation stage such that the channel dropping component for a given secondary separation stage is connected to a first or second transmission path from an edge filter of a preceding separation stage and, wherein the diffraction wavelengths of said first and second fiber Bragg gratings of said initial separation stage generally correspond to the characteristic wavelength of said edge filter of said initial separation stage.

* * * * *